United States Patent [19]

Douros, Jr. et al.

[11] 3,928,017

[45] Dec. 23, 1975

[54] VIOLURIC ACID AS AN ALGAECIDE

[75] Inventors: John D. Douros, Jr.; Al F. Kerst, both of Littleton, Colo.

[73] Assignee: The Gates Rubber Company, Denver, Colo.

[22] Filed: Dec. 15, 1972

[21] Appl. No.: 315,711

Related U.S. Application Data

[62] Division of Ser. No. 78,322, Aug. 31, 1970, Pat. No. 3,728,461.

[52] U.S. Cl. .................................................. 71/67
[51] Int. Cl. .................................................. A01n 23/00
[58] Field of Search .................................................. 71/67

[56] References Cited

UNITED STATES PATENTS 3,753,362 8/1973 Kerst et al. ............................ 71/67
3,764,678 10/1973 Kmusli et al. ............................ 71/67

*Primary Examiner*—James O. Thomas, Jr.
*Attorney, Agent, or Firm*—Raymond Fink; H. W. Oberg, Jr.; Curtis H. Castleman, Jr.

[57] ABSTRACT

Violuric acid can be used to inhibit and/or prevent the growth of many undesirable forms of algae, bacteria and fungi. This invention is particularly concerned with the algaecidal properties of violuric acid against the algae species *Scenedesmus*, *Plectonema*, *Anabaena*, *Ankistrodesmus*, *Oscillatoria*, *Coccochloris*, *Chlamydomonas*, *Lyngbya*, *Synura* and *Chlorella*. The bactericidal properties of violuric acid are especially useful in combating *Xanthomonas* and *Erwinia* species.

34 Claims, No Drawings

VIOLURIC ACID AS AN ALGAECIDE

This is a division of application Ser. No. 78,322, filed on Aug. 31, 1970 now U.S. Pat. No. 3,728,461.

BACKGROUND OF THE INVENTION

The demand for both general and selective algaecides has become more acute as greater demands are put upon existing water supplies. The chemical arts have produced a variety of compounds which have proved to be useful in controlling many algae species responsible for various nuisance and health problems. Water treatment researchers such as Palmer, C. and Maloney, T., Ohio Jour. of Sci., 55, 1 (1955) and Sawyer, C., Jour. of Water Pollution Control Federation, 34, 279 (1962) have reported the use of a wide variety of chemical algaecides such as copper sulphates, chlorine, quaternary ammonium, rosin amines, quinones, activated silver, antibiotics and organic zinc compounds. Representative patented algaecidal compounds can be found in U.S. Pat. Nos. 2,999,810; 3,052,594; 3,396,158 and 3,481,730. Similarly, the demand for selective bactericidal and fungicidal compounds has grown with man's increased concern for the environmental damage caused by many fungicidal and pesticidal compounds. Chemical research has developed many microorganism inhibiting compounds which contain the barbituric acid nucleus;

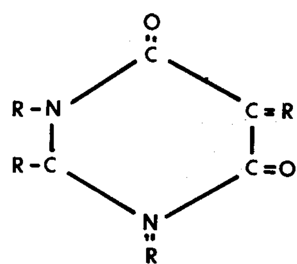

wherein R represents various substituents. Representative biologically active barbituric compounds are found in U.S. Pat. Nos. 2,561,688; 2,605,209; 2,725,380; 2,820,035; 2,887,487 and 3,102,072. The algaecidal, bactericidal, or fungicidal properties of violuric acid however, have not been previously discovered.

SUMMARY OF THE INVENTION

According to the present invention, it has been found that violuric acid

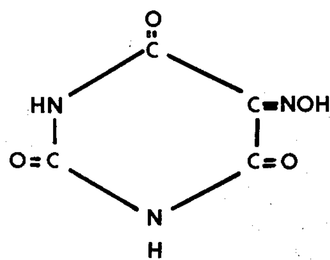

compounds are very effective algaecidal, bactericidal and fungicidal agents. Violuric acid has been known to the chemical arts for many years and references to various synthetic procedures for preparing it have been given by Guinchard, J., Chem. Ber., 32, 1723 (1899) and Cresole, M., Chem. Ber., 16, 1133 (1883).

The violuric acid used in this invention was prepared by the following procedure. A 5-liter flask was equipped with an overhead stirrer, thermometer and power addition funnel whereupon 3.7 liters of water and 240 grams of hydroxylamine hydrochloride were added to 500 grams of alloxan monohydrate. The mixture was heated at 80°–90° C for 1 hour. The final solution was concentrated by removing water under vacuum until precipitation started. The final reaction mixture was cooled in ice and the product isolated by filtration. The final product was characterized by its decomposition point (240° C.), infrared spectrum and nitrogen analysis.

UTILITY OF THE INVENTION

The presence of algae in water can result in such deleterious effects as rampant plant growth, health hazards, discoloration, bad taste and odor as well as blockage of pipes, filters, tanks and similar equipment. The Applicants have discovered that violuric acid compounds can be used to inhibit the growth of a wide variety of algae species which cause these problems in water supplies. For example, violuric acid compounds may be employed against: (1) taste and odor causing algae such as *Anabaena* and *Synura;* (2) filter clogging algae such as *Chlorella*, *Oscillatoria* and *Anabaena;* (3) polluted water algae such as *Lyngbya*, *Chlamydomonas*, *Anabaena* and *Oscillatoria;* (4) clean water algae such as *Ankistrodesmus* and (5) surface water algae such as *Scenedesmus*.

DESCRIPTION OF THE PREFERRED EMBODIMENTS

The algaecidal effectiveness of violuric acid against these species was determined by the following test. Algal cultures representing *Scenedesmus*, *Chlorella*, *Plectonema*, *Anacystis*, *Ankistrodesmus*, *Anabaena*, *Synura*, *Oscillatoria*, *Chlamydomonas*, *Coccochloris* and *Lyngbya* were each maintained in Chu No. 10 Broth Medium (Calcium nitrate, 0.040 grams; Potassium phosphate, 0.010 grams; Magnesium sulphate, 0.025 grams; Sodium carbonate, 0.020 grams; Sodium silicate, 0.025 grams; Ferric citrate, 0.003 grams; Citric acid, 0.003 grams and deionized water, 1,000 ml.) in the presence of sunlight. Hardened Chu No. 10 Agar plates were inoculated with cotton swabs saturated with the respective algae broth cultures. The violuric acid was tested by impregnating filter papers discs (1.27 cm. in diameter, No. 740-E, Schleicher and Schuell, Keene, N.H.) with 0.08 ml. of a violuric acid solution. The saturated filter discs were placed on the surface of the seeded agar plates and the optimum broth temperature of 25° to 27°C. was maintained. The results of these tests are expressed as inhibition zone diameters in centimeters.

Algal Screen

| Compound: Violuric Acid<br>*Algae* | Zones of Inhibition for Various Concentrations<br>100 μg/disc | 10 μg/disc | 3 μg/disc |
|---|---|---|---|
| *Scenedesmus basilensis* Taft EEC - 83 | 1.7 | .75 | 0 |
| *Scenedesmus obliquus* Taft EEC - 92 | 2.0 | 1.00 | 0 |
| *Scenedesmus obliquus* SRI | Trace | 0 | 0 |
| *Chlorella vulgaris* | | | |

-continued

Algal Screen

| Compound: Violuric Acid Algae | Zones of Inhibition for Various Concentrations 100 μg/disc | 10 μg/disc | 3 μg/disc |
|---|---|---|---|
| ATCC - 9765 | Trace | 0 | 0 |
| *Plectonema notatum* Taft EEC - 172 | 2.5 | 1.80 | 1.0 |
| *Anacystis nidulans* Taft EEC - 134 | Trace | 0 | 0 |
| *Ankistrodesmus* var. *Acicularis* Taft EEC - 28 | 2.0 | 1.1 | 0 |
| *Anabaena catenula* SRI | 1.9 | 1.0 | 0 |
| *Synura ulvella* UI | Trace | 0 | 0 |
| *Oscillatoria corneti* UI | 1.8 | 1.0 | 0 |
| *Coccochloris elebans* SRI | 1.7 | 0 | 0 |
| *Chlamydomonas radiati* UA | 1.8 | 1.0 | 0 |
| *Lyngbya* sp. Taft EEC - 166 | 1.9 | 0 | 0 |

Those skilled in the art will recognize that the scope of this invention should not be limited to the particular species of the above genera. For instance, the noted activity of violuric acid against *Chlorella vulgaris* suggests that the compound will also prove to be of value against such other *Chlorella* species such as *Chlorella ellipsoidea*, *Chlorella pyrenoidosa*, *Chlorella variegata* etc. Similar possibilities exist for species of the other genera whose activity was shown to be arrested by violuric acid. It should also be recognized that other appropriate algae genera may well afford additional opportunities to further define the degree and spectrum of the algaecidal activity disclosed in this invention. Since no firm procedure can be laid down for the sequencing of such evaluations or for a selection among the more than 20,000 known algae species, the violuric acid compounds of this invention must be considered on the basis of their demonstrated performance in these primary evaluations and then progressively judged in subsequent studies.

Subsequent evaluations should include but not be limited to the following algae genera.

| Taste and Odor Causing Algae Genera | | |
|---|---|---|
| *Asterionella* | *Peridinium* | *Nitella* |
| *Anabaena* | *Mallomonas* | *Dinobryon* |
| *Microcystis* | *Aphanizomenon* | *Volvox* |
| *Uroglenopsis* | *Staurastrum* | *Pandorina* |
| *Hydrodictyon* | *Ceratium* | *Synura* |
| *Synedra* | *Coelosphaerium* | |
| **Clean Water Algae Genera** | | |
| *Rhizoclonium* | *Merismopedia* | *Meridion* |
| *Pinnularia* | *Aphanothece* | *Chromulina* |
| *Cladophora* | *Ulothrix* | *Phacotus* |
| *Rhodomonas* | *Navicula* | *Staurastrum* |
| *Surirella* | *Chamaesiphon* | *Lemanea* |
| *Cyclotella* | *Micrasterias* | *Cocconeis* |
| *Chrysococcus* | *Calothrix* | *Microcoleus* |
| *Ankistrodesmus* | | |
| **Polluted Water Algae Genera** | | |
| *Arthrospira* | *Tetraedron* | *Anabaena* |
| *Merismopedia* | *Euglena* | *Phacus* |
| *Phormidium* | *Spirogyra* | *Gloeogapsa* |
| *Carteria* | *Chlorococcum* | *Stigeoclonium* |
| *Lepocinclis* | *Oscillatoria* | *Gomphonema* |
| *Nitzschia* | *Lyngbya* | *Chlamydomonas* |
| *Chlamydobotrys* | | |
| **Filter Clogging Algae Genera** | | |
| *Anabaena* | *Closterium* | *Spirogyra* |
| *Chroococcus* | *Tabellaria* | *Trachelomenas* |
| *Dinobryon* | *Rivularia* | *Asterionella* |
| *Cymbella* | *Melosira* | *Palmella* |
| *Chlorella* | *Cyclotella* | *Diatoma* |
| *Synedra* | *Navicula* | *Fragilarai* |
| *Tribonema* | *Oscillatoria* | — |

| Surface Water Algae Genera | | |
|---|---|---|
| *Actinastrum* | *Euastrum* | *Zygnema* |
| *Nodularia* | *Gonium* | *Stauroneis* |
| *Coelastrum* | *Desmidium* | *Sphaerocystis* |
| *Euglena* | *Pediastrum* | *Scenedesmus* |
| *Micractinium* | *Eudorina* | *Oocystis* |
| *Mougeotia* | *Gomphosphaeria* | — |
| **Reservoir Algae Genera** | | |
| *Chara* | *Audouinella* | *Compsopogen* |
| *Phormidium* | *Tetraspora* | *Batrachospermum* |
| *Ulothrix* | *Achnanthes* | *Cymbella* |
| *Cladophora* | *Stigeoclonium* | *Bulbochaete* |
| *Gomphonema* | *Lyngbya* | *Draparnaldia* |

It should also be recognized that the use of algaecidal violuric acid compounds should not be restricted to any particular area of application. The scope of this invention should encompass the use of violuric acid in waters of all types such as lakes, rivers, streams, reservoirs, ponds, oceans, as well as recirculating industrial waters. Furthermore, violuric acid compounds of the present invention are also advantageous in that they are biodegradable with none of the degradation products being toxic to fish and most fish food organisms at algae killing concentrations.

Laboratory tests have also shown that violuric acid compounds can be used to protect plant life from diseases caused by bacteria such as *Xanthomonas* and *Erwinia*. This is of commercial significance since manny species of *Xanthomonas* and *Erwinia* cause rotting diseases of corn, sweet potato, cucumber, tomato and wheat as well as late and early blight of fruits. Violuric acid compounds have proved to be particularly effective in reducing losses due to Bacterial Leaf Spot of Tomatoes, *Xanthomonas vesicatoria* and Late Blight of Fruits, *Erwinia carotovora*. The effectiveness of violuric acid compounds against these particular diseases was established in the following manner. The violuric acid composition was prepared for spraying by dissolving it in a suitable solvent such as acetone, methyl alcohol, or ethyl alcohol and then diluting the solution to the desired concentration with deionized water containing wetting and dispersing agents. Tomato seedlings, Bonny Best variety, in seven-leaf to eight-leaf growth stage, were mounted on a compound turntable and sprayed at 35 pounds pressure for 50 seconds with violuric acid solutions at the concentration indicated below. After drying, treated plants were spray-inoculated at 30 pounds pressure with an aqueous cell suspension of *Xanthomonas vesicatoria* containing five per cent Carborundum and then immediately placed in an incubation chamber maintained at 70° F. and 95 per cent plus R.H. After 40 hours in the incubation chamber, the plants were removed to the greenhouse for further development of the infection. Disease severity was determined by counting the lesions present on six to seven treated leaves. The effectiveness of treatment was determined by direct comparison with inoculated controls. Streptomycin sulfate was used as a reference standard.

The test procedures used to establish the efficacy of violuric acid against *Erwinia carotovora*, ATCC 495, were as follows. MacIntosh apple seedlings in the true-leaf stage, grown from seed under greenhouse conditions were mounted on a compound turntable and sprayed at 30 pounds pressure with a violuric acid solution at the concentrations indicated below. The violuric acid was prepared for spraying by dissolving it in a suitable solvent such as acetone, methyl alcohol or ethyl alcohol and then diluting it to the desired concentration with deionized water containing wetting and dispersing agents.

After treated seedlings dried, they were placed among diseased *Erwinia carotovora* apple seedlings, subjected to an initial spore shower by dusting with spores from diseased plants and then left undisturbed in place for approximately 10 days. By this procedure treated plants were subjected to the cited initial spore shower as well as to continuing natural infection pressure from the surrounding inoculum. Observations 10 days after initial inoculation were used to determine the duration of effectiveness of treatments. Untreated controls reflected a 75% to 100% leaf area diseased at this time. The effectiveness of treatment was determined by direct comparison with untreated inoculated controls. Captan was used as a reference standard.

The results of these tests were as follows:

| Microorganism | *Xanthomonas vesicatoria* | *Erwinia carotovora* |
|---|---|---|
| % Inhibition at 500 ppm | 80% | 63% |
| % Inhibition at 1,000 ppm | 100% | 98% |
| Control | Streptomycin sulfate | Karathane |
| Control Concentration | 100 ppm | 200 ppm |

In many situations the concentration of violuric acid required to inhibit the growth of bacteria or fungi will vary with the type of plant to which it is applied and the inherent ability of the environment to support the bacteria or fungi growth. In most cases however, the concentration of the violuric acid will vary from 1 to 1,000 ppm with the preferred amount being in the range of 100–700 ppm.

Those skilled in the art will also recognize that the scope of this invention should not be limited to any particular disease or to any particular species of the genera listed above. For instance, the noted activity of violuric acid against *Xanthomonas vesicatoria* suggests that the compounds will also prove to be of value against such other *Xanthomonas* species as *Xanthomonas phaseoli* (Common Bacterial Blight of Bean), *Xanthomonas vasculorum* (Gumming Disease of Sugar Cane) and *Xanthomonas malvacearum* (Bacterial Blight of Cotton). Similar possibilities exist for various other *Erwinia* species. It should also be recognized that other protectant, systemic and eradicant procedures may provide detection of other biological activities for violuric acid compounds. Pathogens representative of Phycomycetes, Ascomycetes, Basidromycetes and the Fungi Imperfecti may provide indices of other bactericidal or fungicidal activity. Other appropriate host plants may establish additional plant tolerance data. Additional pathogens and appropriate host plants may well afford opportunities to further define the degree and spectrum of the activity disclosed in this invention. Since no firm rules of procedure can be laid down for the sequencing of such evaluations or for the choice of pathogens, these violuric acid compounds should be considered on the basis of their demonstrated performance in such primary evaluations and then progressively judged in subsequent studies. A wide range of pathogens, representative of economically important diseases, can be used to help define the spectra of activity and to assure high degrees of success under field conditions. The following disease organisms, crops and reference standards may be used in such evaluations:

| Disease | Disease Organism | Reference Conpound |
|---|---|---|
| Leaf Rust of Wheat | *Puccinia rubigo-vera* | Maneb, Karathane |
| Leaf Rust of Wheat | *Puccinia rubigo-vera* | Plantvax |
| Rice Blast Disease | *Piricularia oryzae* | Blasticidin |
| Downy Mildew of Sugar Beet | *Peronospora schactii* | Karathane |
| Downy Mildew of Lima Bean | *Phytophthora phaseoli* | Karathane |
| Bean Rust | *Uromyces phaseoli* var. *typica* | Maneb |
| Powdery Mildew of Wheat | *Erysiphe graminis* | Karathane |
| Powdery Mildew of Apple | *Podosphaera leucotricha* | Karathane |
| Powdery Mildew of Roses | *Sphaerotheca pannosa* var. *rosae* | Karathane |
| Powdery Mildew of Cantalope | *Erysiphe cicheracearum* | Karathane |
| Leaf Spot of Wheat | *Helminthosporium sativum* | Maneb |
| Early Blight of Tomato | *Alternaria solani* | Maneb |
| Rice Blast Disease | *Piricularia oryzae* | Blasticidin |
| Cercospora Leaf Spot of Sugar Beets | *Cercospora beticola* | Maneb |
| Septoria Leaf Spot of Celery | *Septoria apii-graveolentis* | Maneb |
| Apple Scab | *Venturia inaequalis* | Cyprex |
| Common Bacterial Blight of Bean | *Xanthomonas phaseoli* | Streptomycin, Sulfate |

NOTE:
Wherever possible, the Applicants recommend the use of "in vivo" procedures to test the violuric acid compositions of this invention to demonstrate their efficacy under more realistic conditions. However, not all pathogens lend themselves to such techniques. In order to provide additional spectrum definitions, the following fruit-rotting, storage decay and bacterial pathogens may be tested by "in vitro" methods:

| | | |
|---|---|---|
| Brown rot of Stone Fruits | *Sclerotinia fructicola* | Captan |
| Grey Mold on Fruit and Vegetables | *Botrytis cinerea* | Maneb |
| Rhizopus Fruit and Vegetable Rot | *Rhizopus nigricans* | Maneb |
| Citrus Green Mold | *Penicillium digitatum* | Maneb |
| Citrus Blue Mold | *Penicillium italicum* | Karathane |
| Bacterial disease of many Fruit Crops | *Pseudomonas syringae* | Captan |

It should also be noted that the protection afforded by violuric acid compounds is achieved with very little damage to the general environment since violuric acid exhibits a high degree of biodegradability. Another important advantage of violuric acid compounds in their algaecidal and agricultural applications is that they can be made up in solid or liquid formulations. Examples of solid formulations are dust, wettable powders, granules and pellets known to the crop dusting art. Solid formulations, particularly floating solid formulations, may also be preferred in combating algae which grow on surface waters. As a dust, violuric acid compounds may be dispersed in powdered solid carriers such as talc, soaps, soapstone, attapulgus clay as well as other finely divided solids. When formulated as wettable powders, the active violuric acid component may be employed in conjunction with inert fillers which may be of the clay type carrier or non-clay type, in conjunction with various combinations of wetting agents and emulsifiers which may permit the adaptation of concentration as a free-flowing powder. Each of these carriers may contain one or more of the specified violuric acid compounds with other carriers which are ordinarily non-reacting or inert substances such as sand, clays, talc, sawdust, alkaline earth carbonates, oxides, phosphates and the like as well as diatomaceous earth, micas or other suitable materials.

When liquid formulations are desired, liquid extenders, dilutants or carriers of a non-reactive nature may be utilized. These compositions should contain approximately 0.1 to 20% by weight and preferably 1 to 10% and most preferably 1 to 3% of the active violuric acid ingredient. Solvents which may be used in the preparation of such compositions would include alcohols, ketones, glycols, mineral spirits and aromatic solvents such as benzene, xylene, nitrobenzene and dimethylformide. Furthermore, to assist in the rapid and complete dispersion in water systems, these violuric acid compositions may also contain approximately 5 to 30% by weight and preferably 10 to 15% by weight of surface-active agents. Suitable surface-active agents include sodium dialkyl sulphates, sodium alkylbenzene sulfonates, sodium carboxylates and nonionic surfactants such as ethoxylated fatty acid alcohols and amines.

Where it is desired to use wettable powders or liquid formulations, either emulsified, dispersed, or suspended in water or other fluids, one or more of the class of materials herein referred to as adjuvants may also be incorporated into the powder, dust or liquid formulation. These adjuvants may comprise surface active agents, detergents, wettable agents, stabilizers, dispersing agents, suspending agents, emulsifying agents, spreaders, stickers and conditioning agents generally. Through their modifying characteristics these adjuvants may facilitate handling application and may enhance or potentiate the violuric acid compounds of this invention in their algaecidal, bactericidal or fungicidal activities by mechanisms which are frequently not well understood. A satisfactory but not exhaustive list of these adjuvants appears in "Soap Chemical Specialties," Volume 31, No. 7, Page 61; No. 8, Pages 48–61; No. 9, Pages 52–67 and No. 10, Pages 38–67 (1955). See also bulletin No. 607 of the Bureau of Entomology and Plant Quarantine of the United States Department of Agriculture.

An additional advantage of the violuric acid compositions of this invention is their compatability with a wide variety of other algaecidal, biocidal and fungicidal materials. For example, it may be convenient to combine one or more of the violuric acid compositions with one or more of the other biocides, fungicides, or algaecides. For example, common fungicides and biocides such as sulphur, inorganic salts such as copper sulphate, activated colloidal silver compounds, copper naphthenate and zinc acetate as well as substituted hydrocarbons and quarternary ammonium compounds, amines and antibiotics may be employed in conjunction with violuric acid compounds.

It should be recognized that other considerations may make some methods of application more favored than others. These considerations may include the type of organisms on which the compound is to be administered, the degree of activity, the degree of inhibition toward the algae organism and possible environmental side effects. Also to be considered is the cost of production and the characteristic solubility of the compounds into which the violuric acid may be introduced.

In their algaecidal aspects the Applicants have discovered that the violuric acid compounds of this invention are active algaecides at relatively low concentrations. For example, it has been discovered that the violuric compounds have imparted a high degree of algaecidal activity at concentrations as low as 0.1 ppm. The amount of violuric acid added to the water will, of course, vary depending upon such factors as the type of algae present, the nature of the body of water, i.e., flowing stream versus small lake etc., and the inherent ability of the body of water to support algae growth. This inherent ability in turn depends upon such factors as exposure to sunlight, PH, nutrient capabilities and the like. In most cases, however, the concentration of violuric acids required to kill or inhibit growth of algaes will vary from 0.1 to 100 ppm with the preferred range being 10 to 20 ppm.

The violuric acid compounds of this invention can be added to the water according to conventional techniques for algaecide application. When treating a lake or body of water which is relatively calm, the conventional procedure is to spray an aqueous solution of the algaecide over the surface of the water. The violuric acid generally will be pre-dissolved in the types of water soluble solvents previously mentioned. In the case of moving water, such as in water treatment plants or industrial facilities, violuric acid algaecides can be added to the water in small amounts at periodic intervals. For economic reasons, volume usages such as in lakes, streams and reservoirs as distinguished from specialized uses such as in aquatic gardens and industrial applications, the concentration of the violuric acid algaecides probably will not be over 10 ppm.

Having thus disclosed our invention, we claim:

1. A method of killing, preventing and inhibiting the growth of algae which comprises applying an effective algaecidal amount of violuric acid to the algae.

2. The method of claim 1 wherein the algae is *Scenedesmus*.

3. The method of claim 1 wherein the algae is *Chlorella*.

4. The method of claim 1 wherein the algae is *Plectonema*.

5. The method of claim 1 wherein the algae is *Anacystis*.

6. The method of claim 1 wherein the algae is *Ankistrodesmus*.

7. The method of claim 1 wherein the algae is *Anabaena*.

8. The method of claim 1 wherein the algae is *Synura*.

9. The method of claim 1 wherein the algae is *Oscillatoria*.

10. The method of claim 1 wherein the algae is *Coccochloris*.

11. The method of claim 1 wherein the algae is *Chlamydomonas*.

12. The method of claim 1 wherein the algae is *Lyngbya*.

13. The method of claim 2 wherein the *Scenedesmus* is *Scenedesmus basilensis*.

14. The method of claim 2 wherein the *Scenedesmus* is *Scenedesmus obliquus*.

15. The method of claim 3 wherein the *Chlorella* is *Chlorella vulgaris*.

16. The method of claim 4 wherein the *Plectonema* is *Plectonema notatum*.

17. The method of claim 6 wherein the *Ankistrodesmus* is *Ankistrodesmus acicularis*.

18. The method of claim 7 wherein the *Anabaena* is *Anabaena catenula*.

19. The method of claim 8 wherein the *Synura* is *Synura ulvella*.

20. The method of claim 9 wherein the *Oscillatoria* is *Oscillatoria corneti*.

21. The method of claim 10 wherein the *Coccochloris* is *Coccochloris elebans*.

22. The method of claim 11 wherein the *Chlamydomonas* is *Chlamydomonas radiati*.

23. The method of claim 12 wherein the *Lyngbya* is *Lyngbya* TAFT EEC 166.

24. The method of killing *Scenedesmus* which comprises adding to water containing said algae from 0.1 to 100 parts per million of water of violuric acid.

25. The method of killing *Chlorella* which comprises adding to water containing said algae from 0.1 to 100 parts per million of water of violuric acid.

26. The method of killing *Plectonema* which comprises adding to water containing said algae from 0.1 to 100 parts per million of water of violuric acid.

27. The method of killing *Anacystis* which comprises adding to water containing said algae from 0.1 to 100 parts per million of water of violuric acid.

28. The method of killing *Ankistrodesmus* which comprises adding to water containing said algae from 0.1 to 100 parts per million of water of violuric acid.

29. The method of killing *Anabaena* which comprises adding to water containing said algae from 0.1 to 100 parts per million of water of violuric acid.

30. The method of killing *Synura* which comprises adding to water containing said algae from 0.1 to 100 parts per million of water of violuric acid.

31. The method of killing *Oscillatoria* which comprises adding to water containing said algae from 0.1 to 100 parts per million of water of violuric acid.

32. The method of killing *Coccochloris* which comprises adding to water containing said algae from 0.1 to 100 parts per million of water of violuric acid.

33. The method of killing *Chlamytomonas* which comprises adding to water containing said algae from 0.1 to 100 parts per million of water of violuric acid.

34. The method of killing *Lyngbya* which comprises adding to water containing said algae from 0.1 to 100 parts per million of water of violuric acid.

* * * * *